United States Patent [19]

Alicke et al.

[11] Patent Number: 5,453,454
[45] Date of Patent: Sep. 26, 1995

[54] PRODUCTION OF FOAM BOARDS OF HIGH COMPRESSIVE STRENGTH FROM STYRENE POLYMERS

[75] Inventors: Gerhard Alicke, Worms; Manfred Weilbacher, Frankenthal; Bernardo Wolff, Mannheim; Hartmut Heinen, Cologne; Franz-Josef Dietzen, Ludwigshafen; Reinhold Weber, Mutterstadt; Manfred Hahn, Neustadt, all of Germany

[73] Assignee: BASF Aktiengesellschaft, Ludwigshafen, Germany

[21] Appl. No.: 343,566

[22] PCT Filed: May 26, 1993

[86] PCT No.: PCT/EP93/01320

§ 371 Date: Nov. 22, 1994

§ 102(e) Date: Nov. 22, 1994

[87] PCT Pub. No.: WO93/24560

PCT Pub. Date: Dec. 9, 1993

[30] Foreign Application Priority Data

Jun. 4, 1992 [DE] Germany ............... 42 18 330.8
Oct. 29, 1992 [DE] Germany ............... 42 36 579.1

[51] Int. Cl.$^6$ .................. C08J 9/08; C08J 9/14
[52] U.S. Cl. .................. 521/79; 521/81; 521/88; 521/97; 521/910; 264/DIG. 5
[58] Field of Search .................. 521/88, 97, 79, 521/81

[56] References Cited

U.S. PATENT DOCUMENTS 5,229,429  7/1993  Hahn et al. ............... 521/87
5,258,415  11/1993  Hahn et al. ............... 521/79

Primary Examiner—Morton Foelak
Attorney, Agent, or Firm—Keil & Weinkauf

[57] ABSTRACT

Process for the production of foam boards having a minimum thickness of 20 mm and a cross-sectional area of at least 50 cm$^2$ by extruding a mixture of the styrene polymer, from 1 to 10% by weight, based on the styrene polymer, of a blowing agent, wherein the blowing agent contains at least one ether from the group consisting of dimethyl ether, methyl ethyl ether and methyl vinyl ether.

5 Claims, No Drawings

PRODUCTION OF FOAM BOARDS OF HIGH COMPRESSIVE STRENGTH FROM STYRENE POLYMERS

The present invention relates to a process for the production of foam boards of high compressive strength by extruding a mixture of styrene polymer, a blowing agent or blowing agent mixture and, if desired, conventional additives and/or auxiliaries.

A multiplicity of blowing agents has been proposed for the production of foam boards based on styrene polymers by extrusion.

For example, EP-A-464 581 discloses a process for the production of foam boards having high compressive strength and a cross-sectional area of at least 50 cm$^2$, in which a mixture of styrene polymer, from 5 to 16% by weight, based on the styrene polymer, of a blowing agent, and, if desired, conventional additives is extruded, where the blowing agent used is a mixture comprising a) from 3 to 70% by weight of an alcohol or ketone having a boiling point of from 56 to 100° C., b) from 5 to 50% by weight of carbon dioxide and c) from 0 to 90% by weight of a saturated $C_3$- to $C_5$-hydrocarbon and/or a hydrogen-containing chlorofluorocarbon or fluorocarbon having a boiling point of from −30° C. to +30° C.

The foam boards produced by known processes have the disadvantage that the final values, for example for heat distortion resistance, become established relatively slowly.

JP-A 60/145 835 discloses the production of a laminate board containing a polystyrene foam layer, in which the polystyrene foam layer has been produced by extrusion using an ether, such as dimethyl ether, methyl ethyl ether or methyl vinyl ether, as blowing agent.

The example describes the production of a board with a thickness of 6 mm using 3.7 parts by weight of dimethyl ether, based on polystyrene, as blowing agent.

It has also been disclosed that adequate dimensional stability and compressive strength of foam boards having a thickness of 20 mm or more, in particular of ≧50 mm, is frequently not guaranteed if blowing agents which diffuse rapidly out of the foam are used.

Furthermore, the use of blowing agents of high blowing force frequently gives foams having a high content of open cells.

Thus, in the process of EP-A-464 581, the production of high-quality foam boards having a thickness of 20 mm or more is frequently only possible in the presence of chlorofluorocarbons or fluorocarbons as blowing agent.

It is an object of the present invention to provide a process for the production of foam boards from styrene polymers having a minimum thickness of 20 mm, in which no toxic blowing agents are used and which gives foams containing closed cells which have only low water-absorption capacity and, in addition to good dimensional stability and compressive strength, have, in particular, high heat distortion resistance. It is a further object of the present invention to provide a process which enables the rapid establishment of the final values, in particular for heat distortion resistance, in the foam boards produced.

We have found that this object is achieved by a process for the production of foam boards having a minimum thickness of 20 mm and a cross-sectional area of at least 50 cm$^2$ by extruding a mixture of a styrene polymer, from 1 to 10% by weight, based on the styrene polymer, of a blowing agent and, if desired, conventional additives and/or auxiliaries, in which the blowing agent used is at least one ether from the group consisting of dimethyl ether, methyl ethyl ether and methyl vinyl ether.

For the purposes of the present invention, styrene polymers are taken to mean polystyrene and copolymers of styrene containing at least 50% by weight of copolymerized styrene.

Examples of suitable comonomers are α-methylstyrene, ring-halogenated styrenes, ring-alkylated styrenes, acrylonitrile, esters of (meth)acrylic acid with alcohols having 1 to 8 carbon atoms, N-vinyl compounds, such as N-vinylcarbazole, maleic anhydride or alternatively small amounts of compounds containing two polymerizable double bonds, such as butadiene, divinylbenzene and butanediol diacrylate.

According to the invention, the blowing agent or blowing agent mixture is used in an amount of from 1 to 10% by weight, preferably from 3 to 9% by weight, in particular from 4 to 8% by weight, based on the styrene polymer. It contains at least one ether from the group consisting of dimethyl ether, methyl ethyl ether and methyl vinyl ether, with the content of the ethers in the blowing agent or blowing agent mixture preferably does not exceed 10% by weight, particularly preferably 30% by weight, in each case based on the blowing agent or blowing agent mixture. Ether contents of less than 0.5% by weight, based on the blowing agent or blowing agent mixture, are generally ineffective.

Particularly favorable according to the invention are ether-containing blowing agent mixtures containing up to 60% by weight, preferably from 5 to 55% by weight, of carbon dioxide and up to 70% by weight of a saturated $C_3$–$C_5$-hydrocarbon, fluorocarbon, chlorofluorocarbon and/or an alcohol or ketone having a boiling point of from 56 to 100° C.

Examples of suitable blowing agent constituents are propane, n-butane, i-butane, neopentane, n-pentane, i-pentane, 1,1,1,2-tetrafluoroethane, 1,1-difluoroethane, 1,1-difluoro-1-chloroethane, ethanol, methanol and acetone. Ethanol is preferred.

In a preferred embodiment, the blowing agent used is a mixture comprising a) from 30 to 100% by weight of dimethyl ether, b) from 0 to 60% by weight of carbon dioxide and c) from 0 to 30% by weight of ethanol.

In a particularly preferred embodiment of the invention, the blowing agent used is a mixture comprising a) from 45 to 95% by weight of dimethyl ether and b) from 5 to 55% by weight of carbon dioxide.

Conventional additives which can be added to the styrene polymer/blowing agent mixture are antistatics, stabilizers, dyes, lubricants, fillers, flameproofing agents and/or nucleating agents in conventional amounts.

The foam boards are produced according to the invention in a manner known per se by extrusion. The styrene polymer plasticated by warming is mixed intimately with the blowing agent mixture and the additives in an extruder. The mixture then passes through a calming zone, in which it is cooled to from about 100° to 120° C. with constant stirring and is subsequently extruded through a die to give boards.

According to the invention, the foam boards have a minimum thickness of 20 mm, preferably 30 mm, particularly preferably 50 mm. The cross-sectional area is at least 50 cm$^2$, preferably at least from 100 to about 1000 cm$^2$. The invention permits the production of boards having a thickness of up to 200 mm, a width of up to 1200 mm and a density of from 25 to 70 g/l.

In a preferred embodiment of the novel process, foam boards having a thickness of from 20 to 100 mm are produced using a blowing agent mixture comprising a) from 10 to 90% by weight, preferably from 20 to 70% by weight, of at least one ether from the group consisting of dimethyl ether, methyl ethyl ether and methyl vinyl ether, b) from 10 to 60% by weight, preferably from 30 to 55% by weight, of carbon dioxide and c) from 0 to 40% by weight, preferably from 1 to 20% by weight, of a saturated $C_3$–$C_5$-hydrocarbon and/or alcohol having a boiling point of from 56° to 100° C.

In a preferred embodiment of the novel process, foam boards having a thickness of at least 100 mm are produced using a blowing agent mixture comprising a) from 40 to 100% by weight, preferably from 60 to 100% by weight, of at least one ether from the group consisting of dimethyl ether, methyl ethyl ether and methyl vinyl ether, b) from 0 to 30% by weight, preferably from 5 to 25% by weight, of carbon dioxide and c) from 0 to 30% by weight, preferably from 1 to 15% by weight, of a saturated $C_3$–$C_5$-hydrocarbon and/or alcohol having a boiling point of from 56° to 100° C.

The invention has numerous advantages. The novel process allows the simple and economical production of thick foam boards from which the blowing agent escapes rapidly without reducing the compressive strength. The foam boards produced by the novel process achieve the final values for compressive strength and heat distortion resistance after only a short storage time.

It is possible to use environmentally friendly blowing agents which are already present in nature or, like dimethyl ether, are broken down very rapidly. Dimethyl ether is broken down in air with a half life of a few days and thus does not accumulate in the atmosphere.

The invention is described with reference to Examples 1 to 8. In the Examples, parts are by weight.

EXAMPLES 1 and 2

100 parts of polystyrene having a melt flow index of 4.5, 0.35 part of hexabromocyclododecane as flameproofing agent, 0.14 part of dicumyl peroxide and 0.51 part of talc for regulating the cell size were fed continuously to an extruder having an internal screw diameter of 53 mm. At the same time, a blowing agent mixture having the composition shown in Table 1 was injected continuously into the extruder through an inlet opening in the extruder. The gel which had been uniformly compounded in the extruder was then, after a residence time of 20 minutes, cooled to an exit temperature of 119° C. and extruded into the atmosphere through a die measuring 50×1.5 mm. The foam was passed through a mold channel connected to the extruder, giving a foamed polystyrene board having a cross-section of 150 mm×60 mm.

EXAMPLES 3 to 8

100 parts of polystyrene having a melt flow index of 4.5 and the amounts shown in Table 2 of hexabromocyclododecane (HBCD), dicumyl peroxide and talc were fed continuously to an extruder having an internal screw diameter of 120 mm. At the same time, the blowing agent mixture having the composition shown in the Table was injected continuously into the extruder through an inlet opening in the extruder. The gel which had been uniformly compounded in the extruder was then, after a residence time of 40 minutes, extruded into the atmosphere through a die with a width of 300 mm. The foam was passed through a mold channel connected to the extruder, giving a foamed polystyrene board having a width of 650 mm. The die gap and the thickness and density, the latter determined in accordance with DIN 53420, of the resultant foam boards are shown in Table 2.

Each of Examples 1 to 8 gave a uniform, closed-cell and shape-stable foam board.

TABLE 1

| Ex. | Amount of blowing agent, % by weight based on polystyrene | $CO_2$ % by wt. | $CH_3OCH_3$ % by wt. | Density g/l | Board-thickness mm |
|---|---|---|---|---|---|
| 1 | 5.8 | — | 100 | 55 | 60 |
| 2 | 7.0 | 43.0 | 57.0 | 63 | 60 |

For Examples 5 and 6, the dimensional stability of the polystyrene boards was determined in accordance with DIN 53431. In each case, storage was for 67 days. The results are shown in Table 3.

TABLE 2

| Ex. | Amount of blowing agent % by wt., based on polystyrene | $C_2H_5OH$ % by wt. | $CH_3OCH_3$ % by wt. | $CO_2$ % by wt. | HBCD Parts | Dicumyl peroxide Parts | Talc Parts | Die gap mm | Board thickness mm | Foam density g/l |
|---|---|---|---|---|---|---|---|---|---|---|
| 3 | 6.7 | — | 100 | — | 1.00 | 0.21 | 0.64 | 1.5 | 60 | 31 |
| 4 | 7.7 | 15.6 | 84.4 | — | 1.00 | 0.20 | 0.85 | 2.1 | 100 | 31 |
| 5 | 7.0 | 15.2 | 62.9 | 21.9 | 0.95 | 0.19 | 0.15 | 2.1 | 80 | 30.9 |
| 6 | 7.1 | 14.7 | 63.6 | 21.7 | 0.95 | 0.19 | 0.15 | 1.6 | 70 | 31.1 |
| 7 | 6.9 | — | 100 | — | 1.00 | 0.20 | 0.15 | >3.5 | 200 | 30.5 |
| 8 | 7.0 | — | 100 | — | 1.00 | 0.20 | 0.29 | >3.5 | 200 | 33.1 |

TABLE 3

| | Dimensional stability at 85° C. in % | | | Dimensional stability at 90° C. in % | | |
| --- | --- | --- | --- | --- | --- | --- |
| Ex. | Length | Width | Thickness | Length | Width | Thickness |
| 5 | −0.73 | −0.64 | −0.48 | −2.01 | −1.94 | −1.67 |
| 6 | −0.67 | −0.68 | −0.66 | −1.98 | −2.01 | −1.70 |

We claim:

1. A process for the production of foam boards having a minimum thickness of 60 mm and a cross-sectional area of at least 50 cm$^2$ by extruding a mixture of a styrene polymer, from 1 to 10% by weight, based on the styrene polymer, of a blowing agent and, conventional additives and/or auxiliaries, wherein the blowing agent used is a mixture comprising from 5 to 55% by weight of carbon dioxide and at least 30% by weight of an ether from the group consisting of dimethyl ether, methyl ethyl ether and methyl vinyl ether, no chlorofluorocarbon or fluorocarbon being present.

2. A process as claimed in claim 1, wherein the ether used is dimethyl ether.

3. A process as claimed in claim 1, wherein the foam boards having a minimum thickness of 100 mm are produced using a blowing agent comprising at least 40% by weight of one of said ethers.

4. A process as claimed in claim 1, wherein up to 30% by weight of ethanol is present in the blowing agent mixture.

5. A process as claimed in claim 1, wherein the blowing agent used is a mixture comprising
   a) from 45 to 95% by weight of dimethyl ether and
   b) from 5 to 55% by weight of carbon dioxide.

* * * * *